US006705124B2

(12) United States Patent
Zhong et al.

(10) Patent No.: US 6,705,124 B2
(45) Date of Patent: Mar. 16, 2004

(54) HIGH-DENSITY PLASMA DEPOSITION PROCESS FOR FABRICATING A TOP CLAD FOR PLANAR LIGHTWAVE CIRCUIT DEVICES

(75) Inventors: Fan Zhong, Fremont, CA (US); Jonathan G. Bornstein, Cupertino, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 318 days.

(21) Appl. No.: 09/874,434

(22) Filed: Jun. 4, 2001

(65) Prior Publication Data

US 2002/0178759 A1 Dec. 5, 2002

(51) Int. Cl.$^7$ .............................. G02B 6/10; C03B 37/18
(52) U.S. Cl. ............................. 65/386; 65/413; 65/429; 65/391; 385/129
(58) Field of Search .................... 65/129, 386, 391, 65/398, 413, 429; 385/129, 132

(56) References Cited

U.S. PATENT DOCUMENTS

| | | | | |
|---|---|---|---|---|
| 4,045,198 A | | 8/1977 | Rau | 65/33 |
| 4,242,118 A | | 12/1980 | Irven | 65/3 |
| 4,851,025 A | | 7/1989 | Siefert | 65/31 |
| 4,934,774 A | | 6/1990 | Kalnitsky | 350/96.12 |
| 5,408,569 A | | 4/1995 | Nishimoto | 385/132 |
| 5,500,916 A | | 3/1996 | Cirelli | 385/37 |
| 5,904,491 A | | 5/1999 | Ojha | 438/31 |
| 5,978,539 A | | 11/1999 | Davies | 385/129 |
| 5,991,487 A | | 11/1999 | Sugiyama | 385/129 |
| 6,002,823 A | | 12/1999 | Chandross | 385/50 |
| 6,108,480 A | | 8/2000 | Mizuta | 385/129 |
| 6,192,712 B1 | * | 2/2001 | Saito et al. | 65/386 |
| 6,200,651 B1 | * | 3/2001 | Roche et al. | 427/571 |
| 6,377,732 B1 | * | 4/2002 | Li et al. | 385/49 |
| 6,614,977 B2 | * | 9/2003 | Johnson et al. | 385/129 |
| 2002/0001446 A1 | * | 1/2002 | Arakawa | 385/129 |
| 2002/0073738 A1 | * | 6/2002 | Murali | 65/386 |
| 2002/0136478 A1 | * | 9/2002 | Yasuyuki et al. | 385/2 |
| 2002/0191934 A1 | * | 12/2002 | Kato et al. | 385/129 |
| 2002/0194876 A1 | * | 12/2002 | Bona et al. | 65/386 |
| 2003/0002836 A1 | * | 1/2003 | Zhong et al. | 385/132 |
| 2003/0007763 A1 | * | 1/2003 | Bazylenko et al. | 385/129 |
| 2003/0024274 A1 | * | 2/2003 | Cho et al. | 65/386 |
| 2003/0033834 A1 | * | 2/2003 | Bazylenko | 65/386 |
| 2003/0041624 A1 | * | 3/2003 | Won | 65/386 |
| 2003/0044152 A1 | * | 3/2003 | Bazylenko | 385/129 |
| 2003/0044153 A1 | * | 3/2003 | Bazylenko | 385/129 |
| 2003/0059189 A1 | * | 3/2003 | Ridgway et al. | 385/129 |
| 2003/0063883 A1 | * | 4/2003 | Demaray et al. | 385/129 |
| 2003/0072550 A1 | * | 4/2003 | Sasaura et al. | 385/132 |
| 2003/0077060 A1 | * | 4/2003 | Chen et al. | 385/129 |
| 2003/0110808 A1 | * | 6/2003 | M'Saad et al. | 65/379 |
| 2003/0113085 A1 | * | 6/2003 | M'Saad | 385/129 |
| 2003/0127319 A1 | * | 7/2003 | Demaray et al. | 204/192.26 |
| 2003/0133684 A1 | * | 7/2003 | Won et al. | 385/132 |
| 2003/0161571 A1 | * | 8/2003 | Davids et al. | 385/14 |

* cited by examiner

Primary Examiner—José A. Fortuna

(57) ABSTRACT

A method for performing high aspect ratio gap fill during planar lightwave circuit top clad deposition. A plurality of waveguide cores are formed on a substrate, the waveguide cores having a plurality of gaps there between. A cladding layer is formed over the waveguide cores and the substrate using a high-density plasma deposition process. The refractive index of the waveguide cores are controlled by using a dopant to be higher than the refractive of the cladding layer. An anneal process is performed on the cladding layer after the high-density plasma deposition process. The gaps between the waveguide cores can be smaller than 2 microns. The aspect ratio of the gaps between the waveguide cores can be greater than 3. The high-density plasma deposition process provides a very high purity USG (undoped silica glass) and BPSG (Boron Phosphorous silica glass) layers having a uniform refractive index. An overlying layer of doped silica glass can be deposited over the HDP deposited layer using PECVD (plasma enhanced chemical vapor deposition) techniques. The doped silica glass can comprise BPSG or GeBPSG (Germanium Boron Phosphorous silica glass).

19 Claims, 5 Drawing Sheets

US 6,705,124 B2

HIGH-DENSITY PLASMA DEPOSITION PROCESS FOR FABRICATING A TOP CLAD FOR PLANAR LIGHTWAVE CIRCUIT DEVICES

FIELD OF THE INVENTION

The present invention relates generally to the fabrication of planar lightwave circuits. More particularly, the present invention relates to a method and system for a high-density plasma deposition process for fabricating a top clad for an arrayed waveguide grating planar lightwave circuit.

BACKGROUND OF THE INVENTION

Planar lightwave circuits (PLCs) comprise fundamental building blocks for the modern fiber optic communications infrastructure. Planar lightwave circuits are generally devices configured to transmit light in a manner analogous to the transmission of electrical currents in printed circuit boards and integrated circuit devices. Examples include arrayed waveguide grating devices, integrated wavelength multiplexers/demultiplexers, optical switches, optical modulators, wavelength-independent optical couplers, and the like.

PLCs generally involve the provisioning of a series of embedded optical waveguides upon a semiconductor substrate, with the optical waveguides fabricated from a silica glass. Planar lightwave circuits are constructed using the advanced tools and technologies developed by the semiconductor industry. Modern semiconductor electronics fabrication technology can aggressively address the increasing need for integration is currently being used to make PLCs. By using manufacturing techniques closely related to those employed for silicon integrated circuits, a variety of optical elements can be placed and interconnected on the surface of a silicon wafer or similar substrate. This technology has only recently emerged and is advancing rapidly with leverage from the more mature tools of the semiconductor-processing industry.

PLCs are constructed with a number of waveguides precisely fabricated and laid out across a silicon wafer. A conventional optical waveguide comprises an undoped silica bottom clad layer, with at least one waveguide core formed thereon, and a cladding layer covering the waveguide core, wherein a certain amount of at least one dopant is added to both the waveguide core and the cladding layer so that the refractive index of the waveguide core is higher than that of the cladding layer. Fabrication of conventional optical waveguides involves the formation of an undoped silica layer as the bottom clad (BC), usually grown by thermal oxidation upon a silicon semiconductor wafer. The core layer is a doped silica layer, which is deposited by either plasma-enhanced chemical vapor deposition (PECVD) or flame hydrolysis deposition (FHD). An annealing procedure then is applied to this core layer (heated above 1000 C.) not only to expel the undesired chemical substance such as the radicals with bonded hydrogen but also to reduce the inhomogenities of refractive index within the core layer. The waveguide pattern is defined by photolithography on the core layer, and reactive ion etch (RIE) is used to remove the excess doped silica to form waveguide core. A SiO2 cladding layer is then formed through a subsequent deposition process. Finally, the wafer is cut into multiple planar lightwave circuit dies and packaged according to their particular applications.

Prior art FIG. 1 shows a cross-section view of a conventional planar optical waveguide. As depicted in FIG. 1, the planar optical waveguide includes three doped $SiO_2$ glass cores 10a–10c formed over a $SiO_2$ silica bottom clad 12. A BPSG top cladding layer 11 covers both the cores 10a–c and the bottom clad 12. As described above, the refractive index of the cores 10a–c is higher than that of the top cladding layer 11 and the bottom clad 12. Consequently, optical signals are confined axially within cores 10a–c and propagate lengthwise through cores 10a–c. The cores 10a–c are typically doped with Germanium to increase their index of refraction.

Arrayed waveguide grating planar lightwave circuits are one of the most precisely manufactured PLCs. Arrayed waveguide grating devices are used to implement multiplexing or demultiplexing functions within a fiber-optic network. A typical arrayed waveguide grating device is configured for multiplexing or demultiplexing, for example, 16 channels with a separation of 100 gigahertz between the channels. Arrayed waveguide grating devices having 40 channels spaced at 50 gigahertz are commercially available, and even more advanced devices having 128 channels spaced at 25 gigahertz have been demonstrated. Such advanced arrayed waveguide grating devices have enabled the provisioning of dense wave division multiplexing (DWDM) fiber-optic networks, which are increasingly being relied upon to handle the geometrically expanding demand for data transfer bandwidth.

The performance of such advanced arrayed waveguide grating devices (e.g., 40 channels or more) is critically dependent upon the performance of the semiconductor manufacturing technologies used to fabricate them. For example, a 128 channel arrayed waveguide grating device will have at least 128 precisely defined optical waveguides fabricated therein. Small defects, anomalies, imperfections, or the like, have very significant impacts upon the performance of an arrayed waveguide grating device. Any such defect, for example, can directly affect the channel isolation of any of the waveguides within the affected area of the defect, cause signal loss from waveguides within the affected area, or the like. Hence, to maintain acceptable yields while providing the required performance, it becomes extremely important to ensure the fabrication of the optical waveguides of the arrayed waveguide grating devices are as precise and deterministic as possible.

Prior art FIGS. 2A through 2C depict a top clad deposition process wherein three waveguide cores 21–23 are covered during a deposition process to form the top clad (e.g., top cladding layer 11 as shown in FIG. 1). A well known problem with the fabrication of an arrayed waveguide grating devices is the gap fill of high aspect ratio areas between optical waveguide cores during top clad deposition. FIG. 2A shows three cores 21–23 out of the numerous waveguide cores comprising, for example, a 16 channel arrayed waveguide grating device. FIG. 2B shows three waveguides 21–23 at an intermediate step of the top clad deposition process. As shown in FIG. 2B, the gaps between cores 21–23 have been partially filled by the top clad layer 25. Subsequently, as shown in FIG. 2C, when the top clad deposition process is complete, the gaps between cores 21–23 are completely filled and the top clad layer 26 is completely flat and without voids.

Prior art FIG. 3 shows the problems which occur during a top clad deposition process of a highly integrated PLC device. FIG. 3 shows three cores 31–33 which are more closely spaced with respect to waveguides 21–23 of FIG. 2. As is well known, the closely spaced cores 33–31 present high aspect ratio gaps between them which must be filled during the top clad deposition process. The high aspect ratio of the gaps causes micro voids 41 and 42 to form as top clad layer 37 is deposited. The voids 41–42 are serious defects which significantly affect the performance of the waveguides comprising cores 31–33. In a case where the defects are not so significant as to create voids, there may be low density areas within the gaps instead of voids. Crystallization will develop in these low density areas. The areas of local crystallization also adversely affects the performance of the waveguides. Typical prior art top clad deposition processes (e.g., PECVD) can only fill gaps larger than 2 microns (e.g., at an aspect ratio of 3) or larger while ensuring the absence of voids or local crystallization problems.

One solution to this problem is to utilize a very gradual top clad "buildup" process, wherein a number of deposition and anneal cycles are used to gradually buildup the thickness of the top clad layer. Successive thin top clad layers (e.g., typically 4 layers at minimum) are deposited and annealed in an attempt to avoid the formation of voids. While this solution is somewhat effective in filling high aspect ratio gaps, the large number of deposition and anneal cycles greatly decreases the throughput of the fabrication line.

Thus what is needed is a solution that can effectively fill high aspect ratio gaps between waveguide cores of an arrayed waveguide grating PLC device. What is needed is a solution that can fill high aspect ratio gaps without adding an excessive amount of time to the overall device fabrication process. What is further required is a solution that can fill high aspect ratio gaps while ensuring no voids or crystallization problems occur. The present invention provides a novel solution to the above requirements.

SUMMARY OF THE INVENTION

The present invention is a high-density plasma deposition process for fabricating a top clad that can effectively fill high aspect ratio gaps between waveguide cores of an arrayed waveguide grating planar lightwave circuit device. The present invention provides a solution that can fill high aspect ratio gaps while reducing the overall device fabrication process time. Additionally, the present invention provides a solution that can fill high aspect ratio gaps while ensuring no voids or crystallization problems occur.

In one embodiment, the present invention is implemented as a high-density plasma (HDP) deposition process for fabricating a top clad for an arrayed waveguide grating PLC. The HDP deposition process is optimized for performing high aspect ratio gap fill during PLC top clad deposition. During fabrication of the arrayed waveguide grating device, a plurality of waveguide cores are formed on a bottom clad, the waveguide cores having a plurality of gaps there between. The refractive index of the waveguide cores are controlled by using a dopant to be higher than the refractive index of the cladding layer. A cladding layer is formed over the waveguide cores and the bottom clad using an HDP deposition process. The HDP deposition process effectively fills the gaps between the cores. The gaps between the waveguide cores can be smaller than 2 microns. The aspect ratio of the gaps between the waveguide cores can be greater than 3. A one step HDP deposition process can fill the gaps completely. An anneal process is performed on the cladding layer after the HDP deposition process. The HDP deposition process provides a very high purity USG (undoped silica glass) layer having a uniform refractive index. Subsequently, an overlying layer of doped silica glass (e.g., BPSG) can be deposited over the cladding layer using a conventional plasma enhanced chemical vapor deposition (PECVD) process in a one step deposition and anneal cycle to obtain the desired thickness.

The process of the present invention enhances device yield due to the fact that the HDP deposition process can fill high aspect ratio gaps while greatly reducing the number of deposition and anneal cycles, and thus time, of the overall device fabrication process. Additionally, the HDP deposition process solves crystallization problems in the gap areas experienced in the prior art.

In another embodiment, the HDP deposition process is used to deposit a BPSG top clad instead of a USG top clad to reduce the top clad stress. Boron and phosphene is added during the HDP deposition to adjust the CTE (coefficient of thermal expansion) of the top clad (e.g., the resulting CTE of the top clad after anneal) to match the CTE of the silicon substrate. This greatly reduces PDW effects within the PLC device.

BRIEF DESCRIPTION OF THE DRAWINGS

The present invention is illustrated by way of example and not by way of limitation, in the Figures of the accompanying drawings and in which like reference numerals refer to similar elements and in which.

Prior art

Prior art

Prior art

Prior art

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to obscure aspects of the present invention unnecessarily.

Embodiments of the present invention are directed towards an HDP deposition process for fabricating a top clad that can effectively fill high aspect ratio gaps between waveguide cores of an AWG and other types of PLC devices. The present invention provides a solution that can fill high aspect ratio gaps while reducing the overall device fabrication process time. Additionally, the present invention provides a solution that can fill high aspect ratio gaps while ensuring no voids or crystallization problems occur. The present invention and its benefits are further described below.

Figure 1:
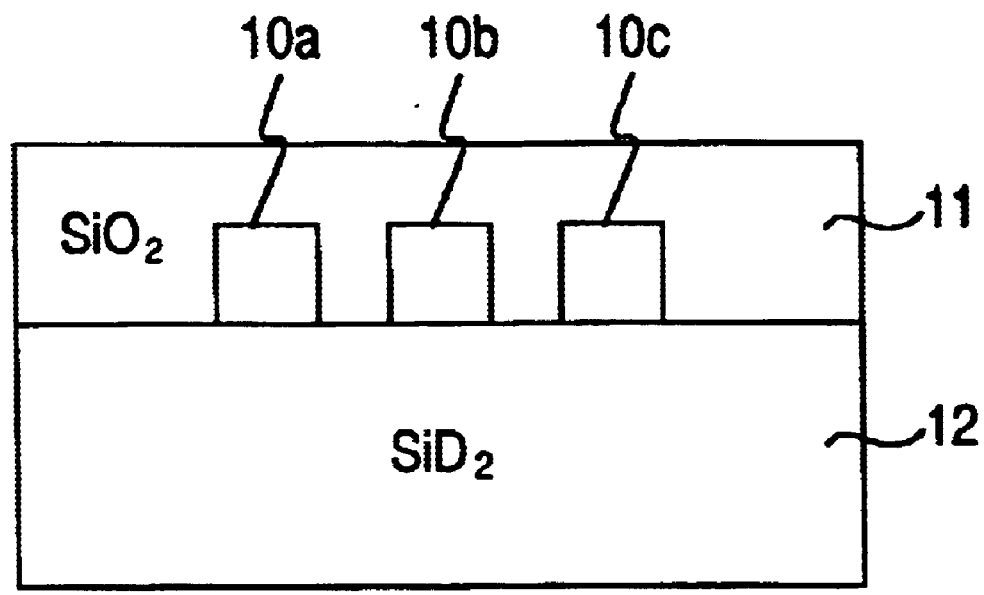
FIG. 1 shows a cross-section view of a conventional planar optical waveguide fabricated using a silica glass substrate.
Figure 2A:
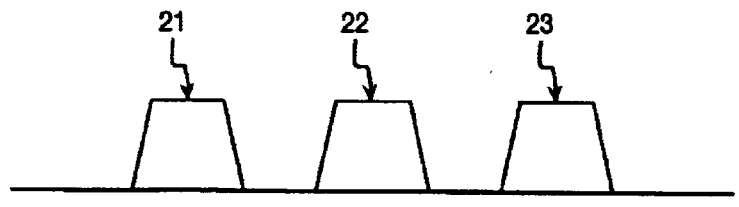
FIG. 2A shows three cores of three optical waveguides of a typical arrayed waveguide grating device.
Figure 2B:
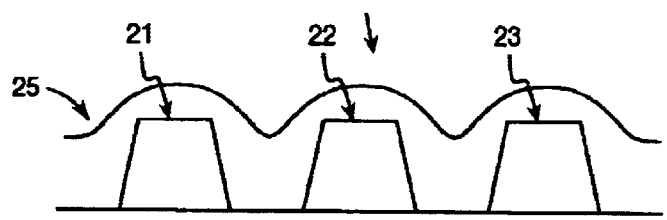
FIG. 2B shows three waveguide cores of three waveguides of a typical arrayed waveguide grating device at an intermediate step of a top clad deposition process.
Figure 2C:
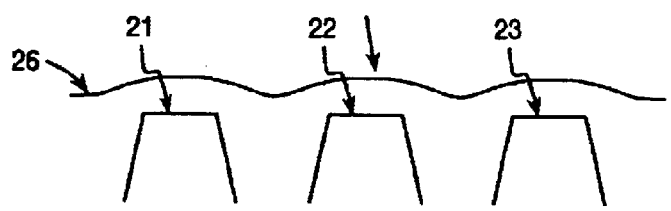
FIG. 2C shows three waveguide cores of three waveguides of a typical arrayed waveguide grating device at the completion of the top clad deposition process.
Figure 3:
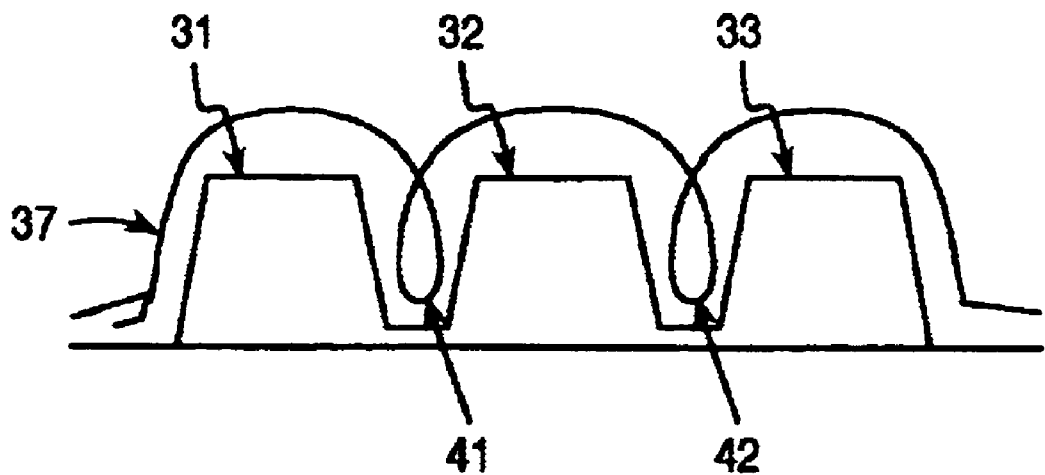
FIG. 3 shows a cross-section view of an optical waveguide structure fabricated in accordance with a waveguide core layer over-etch process of the present invention.
Figure 4:
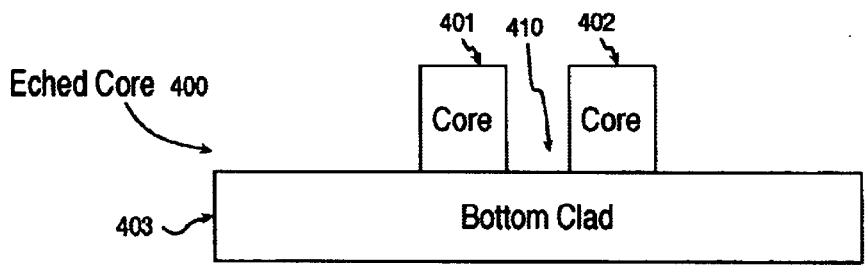
FIG. 4 shows a cross-section view of an optical waveguide structure prior to an HDP deposition process of the present invention.

FIG. 4 shows a cross-section view 400 of an optical waveguide structure fabricated in accordance with an HDP deposition process of the present invention. As depicted in FIG. 4, optical waveguide structure 400 is shown in a state subsequent to etching to remove a core layer used to form core 401 and core 402. Cores 401–402 are disposed on a bottom clad layer 403.

As depicted in FIG. 4, cores 401–402 are disposed very close together on bottom clad 403, thereby forming a high aspect ratio gap 410 between them. It is critical that the high aspect ratio gap 410 be effectively filled during subsequent top clad deposition. As used herein, the term aspect ratio refers to the height of the cores 401–402 divided by the width of the gap 410 between them. For example, in a case where the cores 401–402 are 6 microns high (e.g., from the top of the cores to bottom clad) and the gap 410 is 1 micron wide, the aspect ratio is 6. AWG devices and other related PLC devices are highly dependent upon the precise fabrication of closely spaced optical waveguides such as cores 401–402. The present invention ensures effective gap fill by using an HDP deposition process to lay down a top clad.

Figure 5:
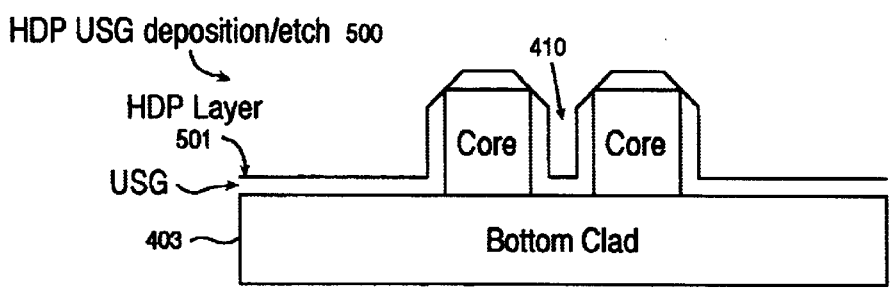
FIG. 5 shows a cross-section view of an optical waveguide structure after the HDP deposition process of the present invention has commenced.

FIG. 5 shows a cross-section view 500 of the optical waveguide structure after an HDP deposition process in accordance with the present invention. As depicted in FIG. 5, a HDP layer 501 has been deposited across cores 401–402 and bottom clad 403. The HDP deposition process is optimized for performing high aspect ratio gap fill during planar lightwave circuit top clad deposition. The HDP deposition process effectively fills the gap 410 between the cores 401–402. The gap 410 can be smaller than 2 microns, and have an aspect ratio greater than 3. In this embodiment, HDP layer 501 is a USG (undoped silica glass) layer.

HDP deposition is an emerging technology based on the use of high-density plasma to ensure gap fill. High-density plasma is used to impart simultaneous chemical vapor deposition (e.g., $SiO_2$) and the sputter etching of the target (e.g., the deposited layer) from bombarding ions. Void free gap filling occurs within narrow spaces with high aspect ratios by depositing $SiO_2$ under continuous ion bombardment. The ion bombardment removes material building up at the upper corners of the gaps. The removal of this material greatly reduces the likelihood of void formation.

Figure 6:
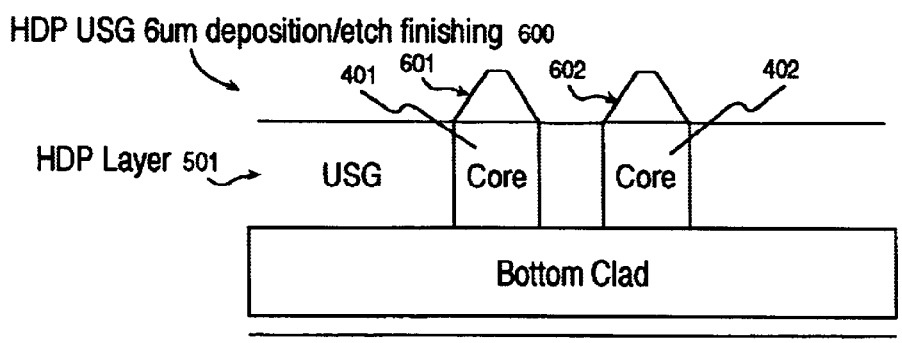
FIG. 6 shows a cross-section view of the optical waveguide structure after the HDP deposition process is complete.

FIG. 6 shows a cross-section view 600 of the optical waveguide structure after the HDP deposition process is complete. Cross-section view 600 shows the top clad layer 501 after completion of the HDP deposition process, showing the completed top clad layer 501 at the same height as cores 401–402 (e.g., 6 microns). The cores 401–402 have residual HDP layer peaks 601–602 disposed above them. Thus, using the HDP deposition process of the present invention, the top clad layer 501 can be completed in a single deposition cycle, and subsequent annealing. In contrast, prior art top clad deposition processes (e.g., PECVD) cannot fill gaps any smaller than 2 microns (e.g., having an aspect ratio of 3) without experiencing significant void and crystallization problems. Since an HDP deposition process applies deposition and etch at same time, the material inside gap 410 is much more dense than possible with, for example, a PECVD deposition process. The higher density provides for a much more effective fill of high aspect ratio (e.g., aspect ratio 9) gaps without any micro void formation or crystallization problems.

Figure 7:
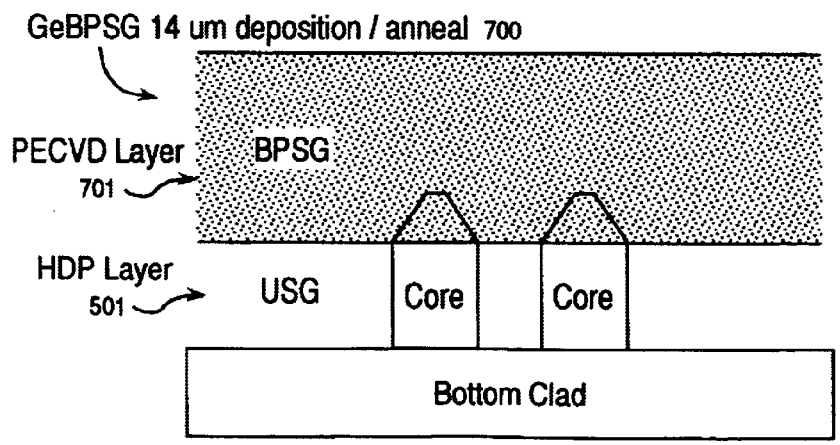
FIG. 7 shows a cross-section view of the optical waveguide structure after a PECVD deposition of an overlying BPSG layer.

FIG. 7 shows a cross-section view 700 of the optical waveguide structure after a PECVD deposition of an overlying PECVD layer 701. In this embodiment, HDP deposition is used to fill the gap between the cores 401–402 (e.g., 6 microns deep) in a single deposition step. Then, a thick layer of BPSG (e.g., 10 to 14 microns deep) is deposited using conventional PECVD. The PECVD layer 701 can be deposited on the top of HDP deposition formed layer 501 without difficulty. In this embodiment, PECVD is used to form layer 701 since the PECVD deposition rate is faster than the HDP deposition rate. Once the gaps are filled, the faster PECVD processing can be taken advantage of.

It should be noted that production cycle time is greatly reduced in comparison to the prior art, due to the fact that 6 or 7 deposition/anneal steps are required in a prior art PECVD BPSG (Boron Phosphorous silica glass) top clad deposition process and 4 deposition/anneal steps are required in prior art PECVD BPSG top clad deposition process. In contrast, the USG HDP deposition process of the present invention is accomplished in a single step.

It should also be noted that GeBPSG (Germanium Boron Phosphorous silica glass) can also be deposited as the PECVD layer 701 instead of PBSG.

Figure 8:
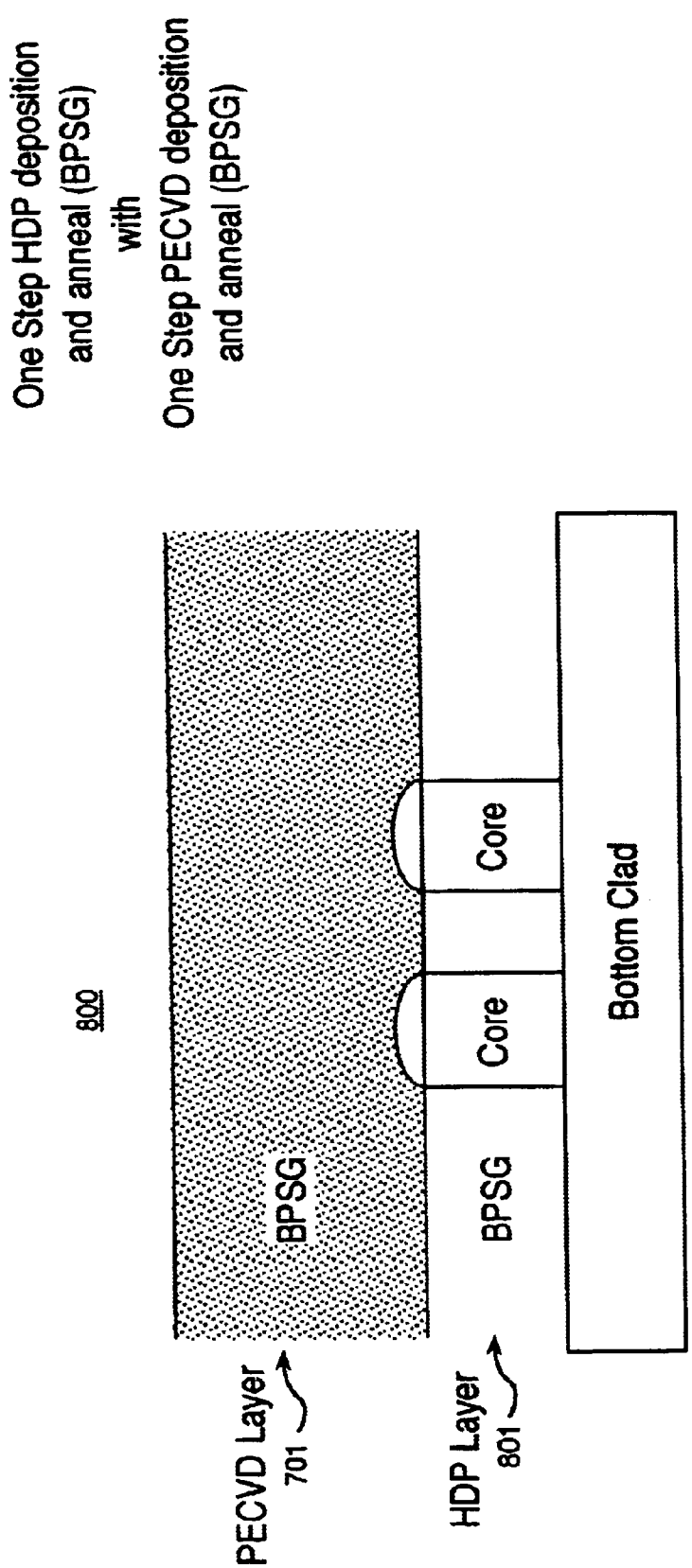
FIG. 8 shows a cross-section view of the optical waveguide structure with an HDP deposited BPSG layer and an overlying PECVD BPSG layer as the top clad.

FIG. 8 shows a cross-section view 800 of an optical waveguide structure in accordance with an alternative embodiment of the present invention. In this embodiment, the HDP deposition process is used to deposit a BPSG HDP layer instead of a USG HDP layer. BPSG is deposited to reduce the top clad stress. Boron and phosphene is added during the HDP deposition of HDP layer 801 to adjust the CTE (coefficient of thermal expansion) of the top clad (e.g., the resulting CTE of the top clad after anneal) to match the CTE of the silicon substrate. This greatly reduces PDW effects within the PLC device. PECVD is used to form PECVD layer 701, in the same manner described above.

Thus, embodiments of the present invention are directed towards an HDP deposition process for fabricating a top clad that can effectively fill high aspect ratio gaps between waveguide cores of an AWG PLC device. The present invention provides a solution that can fill high aspect ratio gaps while decreasing the overall device fabrication process time. Additionally, the present invention provides a solution that can fill high aspect ratio gaps while ensuring no voids or crystallization problems occur.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. A method for performing high aspect ratio gap fill during planar lightwave circuit top clad deposition, the method comprising the steps of:
   a) forming a plurality of waveguide cores on a substrate, the waveguide cores having a plurality of gaps there between; and
   b) forming a cladding layer over the waveguide cores and the substrate using an HDP (high-density plasma) deposition process, the cladding layer having a lower refractive index than the waveguide cores;
   wherein the aspect ratio of the gaps between the waveguide cores is greater than 3.

2. The method of claim 1 further including the step of performing an anneal process after the HDP deposition process.

3. The method of claim 1 wherein the gaps between the waveguide cores are smaller than 2 microns.

4. The method of claim 1 wherein the HDP deposition process deposits high purity USG (undoped silica glass) to provide a uniform refractive index for the cladding layer.

5. The method of claim 1 further including the step of forming an overlying layer over the cladding layer using a PECVD (plasma enhanced chemical vapor deposition) process.

6. The method of claim 5 wherein the overlying layer is a doped silica glass layer.

7. The method of claim 6 wherein the doped silica glass is BPSG (Boron Phosphorous sillica glass) or GeBPSG (Germanium Boron Phosphorus sillica glass).

8. The method of claim 1 wherein the HDP deposition process with dopants Germanium, Boron, and Phosphorous, in any combination or individually.

9. A method of making an optical waveguide for a planar lightwave circuit, the method comprising the steps of:
   a) forming a bottom cladding on a silicon substrate;
   b) forming a waveguide core layer on the bottom cladding, the waveguide core layer having a higher refractive index than the bottom cladding;
   c) forming a plurality of waveguide cores from the waveguide core layer, the waveguide core, having a plurality of gaps there between; and
   d) forming a top cladding over thee waveguide cores using an HDP (high-density plasma) deposition process to form an optical waveguide of a planar lightwave circuit;
   wherein the aspect ratio of the gaps between the waveguide cores is greater than 3.

10. The method of claim 9 further including the step of performing an anneal process after the HDP deposition process.

11. The method of claim 9 wherein the gaps between the waveguide cores are smaller than 2 microns.

12. The method of claim 9 wherein the HDP deposition process deposits high purity USG (undoped silica glass) to provide a uniform refractive index for the cladding layer.

13. The method of claim 9 further including the step of forming an overlying layer over the cladding layer using a PECVD (plasma enhanced chemical vapor deposition) process.

14. The method of claim 13 wherein the overlying layer is a doped silica glass layer.

15. The method of claim 14 wherein the doped silica glass layer is BPSG (Boron Phosphorous sillica glass) or GeBPSG (Germanium Boron Phosphorous sillica glass).

16. The method of claim 9 wherein the HDP deposition process with dopants Germanium, Boron, and Phosphorous, in any combination or individually.

17. A method of making an AWG (arrayed waveguide grating) planar lightwave circuit, the method comprising the steps of:
   a) forming a bottom cladding on a substrate;
   b) forming a waveguide core layer on the bottom cladding, the waveguide core layer having a higher refractive index than the bottom cladding;
   c) forming a plurality of waveguide cores from the waveguide core layer, the waveguide cores having a plurality of gaps there between;
   e) forming a HDP (high-density plasma) layer over the waveguide cores using an HDP deposition process to form an optical waveguide of an AWG planar lightwave circuit; and
   f) performing an anneal process after the HDP deposition process
   wherein the aspect ratio of the gaps between the waveguide cores is greater than 3.

18. The method of claim 17 wherein the gaps between the waveguide cores are smaller than 2 microns.

19. The method of claim 17 further including the step of forming a PECVD (plasma enhanced chemical vapor deposition) layer of BPSG (Boron Phosphorous silica glass) or GeBPSG (Germanium Boron Phosphorous silica glass) over the HDP layer using a PECVD process.

* * * * *